UNITED STATES PATENT OFFICE.

GEORGE RUSSELL, OF McKEESPORT, PENNSYLVANIA.

ENAMELING COMPOUND.

SPECIFICATION forming part of Letters Patent No. 230,965, dated August 10, 1880.

Application filed April 10, 1880. (Specimens.)

*To all whom it may concern:*

Be it known that I, GEORGE RUSSELL, of McKeesport, in the county of Allegheny, State of Pennsylvania, have invented a new and useful Improvement in Enameling Compounds; and I do hereby declare that the following is a full and exact description thereof.

My improvement in enameling compounds consists of boiled linseed-oil, asphaltum, protoxide of lead, gum-shellac, and naphtha, combined in the quantities and treated in the manner hereinafter described.

To enable others skilled in the art with which my invention is most nearly connected to make and use it, I will proceed to describe the manner of compounding and using it.

I take about two (2) pounds of asphaltum, and about one and one-half (1½) gallons of naphtha, and place these two ingredients in a suitable vessel and subject them to a low heat, (by preference using steam as the heating medium,) and thereby dissolving the asphaltum, and while in its heated condition about two (2) ounces of gum-shellac is added to this heated mixture, stirring the whole until the gum-shellac is dissolved, and to this heated mixture is added about one-fourth (¼) of an ounce of protoxide of lead, and after stirring it thoroughly with said mixture, about three and one-half (3½) pints of boiled linseed-oil is added, and the whole subjected to heat for a short time, taking care to keep stirring the whole while being subjected to heat, and also taking care to prevent the heated mixture from igniting.

After treating the several ingredients as hereinbefore described the resulting compound or liquid enamel is allowed to cool off, and the article to be enameled is coated with it by the painting or dipping process, and is then placed in an oven and subjected to a high degree of heat—say not less than three hundred, (300,) nor more than six hundred (600) degrees Fahrenheit.

The enameling compound hereinbefore described, when applied in the manner herein set forth, will give to the article coated a black and highly-finished surface.

Having thus described my improvement, what I claim is—

An enameling compound composed of asphaltum, naphtha, shellac, protoxide of lead, and boiled linseed-oil, in the proportions substantially as herein described.

GEO. RUSSELL.

Witnesses:
 J. J. JOHNSTON,
 D. C. ALLEN.